(12) United States Patent
Zhang

(10) Patent No.: US 11,592,069 B2
(45) Date of Patent: Feb. 28, 2023

(54) YAW BRAKE PAD AND METHOD OF PRODUCING THE SAME

(71) Applicants: FORDA ENERGY UK LIMITED, London (GB); Pengfei Zhang, Inner Mongolia (CN)

(72) Inventor: Pengfei Zhang, Inner Mongolia (CN)

(73) Assignee: FORDA ENERGY UK LIMITED, London (GB)

( * ) Notice: Subject to any disclaimer, the term of this patent is extended or adjusted under 35 U.S.C. 154(b) by 505 days.

(21) Appl. No.: 16/623,710

(22) PCT Filed: Apr. 9, 2018

(86) PCT No.: PCT/CN2018/082397
§ 371 (c)(1),
(2) Date: Dec. 17, 2019

(87) PCT Pub. No.: WO2018/233349
PCT Pub. Date: Dec. 27, 2018

(65) Prior Publication Data
US 2020/0141462 A1    May 7, 2020

(30) Foreign Application Priority Data
Jun. 20, 2017    (CN) .......................... 201710470375.8

(51) Int. Cl.
| | | |
|---|---|---|
| *F16D 69/02* | (2006.01) | |
| *C08L 71/00* | (2006.01) | |
| *B29B 9/06* | (2006.01) | |
| *B29C 45/00* | (2006.01) | |
| *B29K 71/00* | (2006.01) | |
| *B29K 307/04* | (2006.01) | |
| *B29K 309/08* | (2006.01) | |
| *B29K 507/04* | (2006.01) | |
| *B29K 509/02* | (2006.01) | |
| *B29L 31/16* | (2006.01) | |
| *F03D 7/02* | (2006.01) | |

(52) U.S. Cl.
CPC .............. *F16D 69/026* (2013.01); *B29B 9/06* (2013.01); *B29C 45/0001* (2013.01); *B29K 2071/00* (2013.01); *B29K 2307/04* (2013.01); *B29K 2309/08* (2013.01); *B29K 2507/04* (2013.01); *B29K 2509/02* (2013.01); *B29L 2031/16* (2013.01); *F03D 7/0204* (2013.01); *F16D 2200/0052* (2013.01); *F16D 2200/0065* (2013.01); *F16D 2200/0086* (2013.01)

(58) Field of Classification Search
CPC ............................. C08L 71/00; F16D 69/026
See application file for complete search history.

(56) References Cited

U.S. PATENT DOCUMENTS

| | | | | |
|---|---|---|---|---|
| 7,608,648 B2 * | 10/2009 | Meakin | ................... | C08G 65/40 |
| | | | | 524/611 |
| 2017/0198751 A1 * | 7/2017 | Gruell | ................. | B29C 45/0005 |

FOREIGN PATENT DOCUMENTS

| | | | | |
|---|---|---|---|---|
| CN | 1154292 A | 7/1997 | | |
| CN | 103772741 A | 5/2014 | | |
| CN | 105440574 A | 3/2016 | | |
| CN | 105524291 A | 4/2016 | | |
| CN | 105733181 A | 7/2016 | | |
| CN | 106051008 A | 10/2016 | | |
| CN | 106243620 A | * 12/2016 | ............. | C08K 13/02 |
| CN | 106433020 A | 2/2017 | | |
| CN | 107286570 A | 10/2017 | | |
| WO | 2015197460 A1 | 12/2015 | | |

OTHER PUBLICATIONS

Chinese First Office Action from CN201710470375.8 dated Feb. 6, 2018, pp. 10.
International Search Report from PCT/CN2018/082397 dated Jul. 9, 2018, pp. 3.

* cited by examiner

*Primary Examiner* — Vickey Nerangis
(74) *Attorney, Agent, or Firm* — Nelson Mullins Riley & Scarborough LLP; Anthony A Laurentano

(57) ABSTRACT

Provided are a yaw brake pad and a method of producing the same, which relate to the technical field of friction material. The yaw brake pad is prepared from, by weight, the following main ingredients: 70-75 parts of polyether ether ketone, 10-20 parts of carbon fiber, 3-5 parts of glass fiber and 3-5 of graphite. It alleviates the technical problem that the metal-based friction materials generally for producing current international and domestic yaw brake pads are likely to rust, harmful to dual discs, and produce screechy. It has not only significantly improved mechanical properties and high temperature tolerance, much lower hardness, less wear to dual discs, and lower noise, but also improved friction stability and adaptability to working conditions, and thus can effectively satisfy the demand of the wind driven generator for yaw braking at a low speed.

13 Claims, No Drawings

YAW BRAKE PAD AND METHOD OF PRODUCING THE SAME

Cross Reference to Related Application

This Application is a U.S. National Phase Application of International Application No. PCT/CN2018/082397, filed on Apr. 9, 2018, which claims the priority to the Chinese Patent Application (No. 201710470375.8), entitled "偏航刹车片及其制备方法", filed with SIPO on Jun. 20, 2017, the entirety of which is incorporated herein by reference.

TECHNICAL FIELD

The present disclosure relates to the technical field of friction material, and particularly to a yaw brake pad and a method of producing the same.

BACKGROUND ART

With the advancement of the science and technology and the rapid development of economy, the demand of human beings for electric power continuously expands. Using non-renewable energy sources like coal and petroleum for power generation is confronted with an awkward situation that resources become increasingly poor. As a green energy, wind energy does not only coincide with the international energy reform, but also is a renewable resource, and it bears positive significance to environment protection as well, and thus has been drawing the attention from more and more countries.

In the process of the power generation of a wind driven generator, the blades of the wind driven generator need to be reoriented as the wind direction changes and be fixed to facing the direction of the optimal wind force, so as to maximize the work efficiency of the wind driven generator. Reorienting the blades of a wind driven generator is realized by a yaw system. To avoid the oscillating wind direction variation which causes yaw gears to produce alternating load, a yaw brake should be used to absorb minor free deflection oscillation, so as to prevent the gear teeth from premature damage caused by the alternating stress from the yaw gears. With the help of the yaw brake pad, the yaw brake prevents a wind driven generator from deflection.

Currently, most of the international and domestic yaw brake pads are made of metal-based friction materials which, however, are too hard, likely to rust, harmful to the dual discs, do not brake smoothly and produce self-excited screechy, among other things. Therefore, it is urgent for those skilled in the art to develop a new yaw brake pad.

In view of this, the present disclosure is hereby proposed.

SUMMARY OF THE DISCLOSURE

One of the purposes of the present disclosure is to provide a yaw brake pad to alleviate the technical problem that the metal-based friction materials generally for producing current international and domestic yaw brake pads are too hard, likely to rust, harmful to the dual discs, do not brake smoothly and produce self-excited screechy, among other things.

The yaw brake pad provided by the embodiments of the present disclosure is prepared from, by weight, the following main ingredients: 70-75 parts of polyether ether ketone, 10-20 parts of carbon fiber, 3-5 parts of glass fiber and 3-5 parts of graphite.

Further, the yaw brake pad is prepared from, by weight, the following main ingredients: 70-75 parts of polyether ether ketone, 10-15 parts of carbon fiber, 3-5 parts of glass fiber, 3-5 parts of graphite, 1-3 parts of copper sulfide and 1-3 parts of carbon nanotubes.

Further, the yaw brake pad is prepared from, by weight, the following main ingredients: 70-75 parts of polyether ether ketone, 10-15 parts of carbon fiber, 3-5 parts of glass fiber, 3-5 parts of graphite, 1-2 parts of copper sulfide, 1-2 parts of carbon nanotubes, 1-2 parts of molybdenum sulfide, 1-2 parts of carbon nitride and 1-2 parts of zirconium carbide.

Further, the polyether ether ketone is granular, the carbon fiber is nano-sized carbon fiber, the glass fiber is nano-sized glass fiber and the graphite is nano-sized graphite.

Further, the main ingredients of the friction material for producing the yaw brake pad further include, by weight, 1-2 parts of heat stabilizer.

Further, the heat stabilizer is one or at least two selected from the group consisting of antioxidant 1098, antioxidant 168, antioxidant H161 and antioxidant 412S.

Further, the carbon nitride is modified by concentrated aqueous ammonia.

Another purpose of the present disclosure is to provide a method of producing the above yaw brake pad to alleviate the technical problem that the metal-based friction materials generally for producing current international and domestic yaw brake pads are too hard, likely to rust, harmful to the dual discs, do not brake smoothly and produce self-excited screechy, among other things.

The method of producing the yaw brake pad provided by the examples of the present disclosure includes the steps of:

(a) mixing the polyether ether ketone, carbon fiber, glass fiber, graphite, optional copper sulfide, optional carbon nanotubes, optional molybdenum sulfide, optional carbon nitride and optional zirconium carbide to obtain an uniform mixture; and (b) performing injection molding on the mixture to produce the yaw brake pad.

Further, the method of producing the yaw brake pad further includes step (s) which is provided between step (a) and step (b). In the step (s), the mixture is pelletized through extrusion to obtain the mixture granules.

Further, an injection molding machine is used to perform the injection molding.

In the present disclosure, using polyether ether ketone as the matrix material, carbon fiber and glass fiber as the reinforcing material, and graphite as the heat conduction material, the yaw brake pad made thereby gets not only significantly improved mechanical properties and high temperature tolerance, much lower hardness, less wear to the dual discs, and lower noise, but also improved friction stability and adaptability to working conditions, and thus can effectively satisfy the demand of the wind driven generator for yaw braking at a low speed.

The method of producing the yaw brake pad provided by the embodiments of the present disclosure is easy to practice and can be done consecutively, which significantly improves the efficiency of and lower the cost of producing the yaw brake pad.

DETAILED DESCRIPTION OF EMBODIMENTS

Now the embodiments of the present disclosure will be described in detail with reference to examples. But those skilled in the art will appreciate that the following embodiments are merely illustrative of the present disclosure, and thus should not be construed as limiting the scope of the present disclosure. Embodiments for which no specific condition is indicated should be done under conventional conditions or as recommended by the manufacturer. All those reagents or instruments for which no manufacturer is indicated are all conventional products which are commercially available.

According to an aspect of the present disclosure, the embodiments of the present disclosure provides a yaw brake pad which is prepared from, by weight, the following main ingredients: 70-75 parts of polyether ether ketone, 10-20 parts of carbon fiber, 3-5 parts of glass fiber and 3-5 parts of graphite.

Polyether ether ketone refers to a linear polymer of which the macromolecular backbone is composed of aryl groups, ketone bonds and ether bonds, and it has the following molecular formula

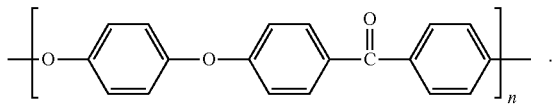

As can be seen from the above molecular formula, polyether ether ketone is a linear aromatic macromolecular compound which belongs to the category of semi-crystalline thermoplastics, with a melting point of 334° C., and having high mechanical strength, high temperature tolerance, impact resistance, flame retardance, acid and base resistance, hydrolysis resistance, wear resistance, fatigue resistance, irradiation resistance and good electrical property. In addition, polyether ether ketone also has excellent dimensional stability and is barely affected by temperature and humidity.

Carbon fiber is a new high-strength and high-modulus fiber material having a carbon content of over 95%. It is a crystallitic graphite material formed by stacking organic fiber such as flake graphitic crystallite in the axial direction of the fiber and then subjecting the stacked fiber to carbonization and graphitization. Carbon fiber is of "soft on the outside and stiff on the inside", which is reflected in that it is lighter in mass than aluminum, but higher in strength than steel. Also, it is a new-generation reinforced fiber which is featured by corrosion resistance and high modulus, yet which is flexible enough to be processed like textile fiber. Carbon fiber has many excellent properties, such as high axial strength and modulus, low density, high specific performance, non-creepage, ultra-high temperature tolerance under a non-oxidzing environment, fatigue resistance, low coefficient of thermal expansion, anisotropy, good corrosion resistance, excellent electrical conductivity, thermal conductivity and electromagnetic shielding.

Glass fiber is an excellent inorganic non-metallic material which has favourable insulating property, heat resistance, corrosion resistance, high mechanical strength, incombustibility and sound insulation. It is mainly composed of silicon dioxide, aluminum oxide, calcium oxide, boron oxide, magnesium oxide and sodium oxide, etc.

Graphite is soft and grey black and has good chemical stability, corrosion resistance and thermal conductivity.

In the present disclosure, typically but not limitedly, the polyether ether ketone accounts for, by weight, e.g. 70.2, 70.4, 70.6, 70.8, 71, 71.2, 71.4, 71.6, 71.8, 72, 72.2, 72.4, 72.6, 72.8, 73, 73.2, 73.4, 73.6, 73.8, 74, 74.2, 74.4, 74.6 or 74.8 parts; typically but not limitedly, the carbon fiber accounts for, by weight, e.g. 10.2, 10.4, 10.6, 10.8, 11, 11.2, 11.4, 11.6, 11.8, 12, 12.2, 12.4, 12.6, 12.8, 13, 13.2, 13.4, 13.6, 13.8, 14, 14.2, 14.4, 14.6, 14.8, 15, 15.2, 15.4, 15.6, 15.8, 16, 16.2, 16.4, 16.6, 16.8, 17, 17.2, 17.4, 17.6, 17.8, 18, 18.2, 18.4, 18.6, 18.8, 19, 19.2, 19.4, 19.6 or 19.8 parts; typically but not limitedly, the glass fiber accounts for, by weight, e.g. 3.1, 3.2, 3.3, 3.4, 3.5, 3.6, 3.7, 3.8, 3.9, 4, 4.1, 4.2, 4.3, 4.4, 4.5, 4.6, 4.7, 4.8 or 4.9 parts; and typically but not limitedly, the graphite accounts for, by weight, e.g. 3.1, 3.2, 3.3, 3.4, 3.5, 3.6, 3.7, 3.8, 3.9, 4, 4.1, 4.2, 4.3, 4.4, 4.5, 4.6, 4.7, 4.8 or 4.9 parts.

Polyether ether ketone not only has an excellent comprehensive property with e.g. high heat resistance, high strength, high modulus and high toughness, but also has excellent hydrolysis resistance and dimensional stability. But it does has its defects, e.g. low heat deformation temperature and high friction coefficient which lead to fast heat generation, and thus heat conduction difficulties and serious heat gathering during rubbing. Therefore, polyether ether ketone needs to be mixed with other modified materials to make an excellent yaw brake pad.

In the present disclosure, using polyether ether ketone as the matrix material, carbon fiber and glass fiber as the reinforcing material, and graphite as the thermally conductive material, the yaw brake pad made thereby gets not only significantly improved mechanical properties and high temperature tolerance, much lower hardness, less wear to the dual discs, and lower noise, but also gets improved friction stability and adaptability to working conditions, and thus can effectively satisfy the demand of the wind driven generator for yaw braking at a low speed.

In a preferred embodiment of the present disclosure, the yaw brake pad is prepared from, by weight, the following main ingredients: 70-75 parts of polyether ether ketone, 10-15 parts of carbon fiber, 3-5 parts of glass fiber, 3-5 parts of graphite, 1-3 parts of copper sulfide and 1-3 parts of carbon nanotubes.

Copper sulfide is an inorganic compound, and particularly a divalent copper sulfide. It is a black monoclinic or hexagonal crystal which is dark brown and sparingly soluble.

Carbon nanotubes are a one-dimensional quantum material with a special structure (nano-sized radial dimension, micron-sized axial dimension, and both ends generally being sealed). Carbon nanotubes consist of several or tens of layers of coaxial circular tubes mainly made up of carbon atoms in hexagonal arrangement. Those layers are spaced from each other at a fixed interval of about 0.34 nm and their diameters generally range from 2 nm to 20 nm. As a one-dimensional nanometer material, carbon nanotubes have a light weight, perfect connections among its hexagonal structures, and many extraordinary mechanical, electrical and chemical properties.

In a preferred embodiment of the present disclosure, typically but not limitedly, copper sulfide accounts for, by weight, e.g. 1.1, 1.2, 1.3, 1.4, 1.5, 1.6, 1.7, 1.8, 1.9, 2, 2.1, 2.2, 2.3, 2.4, 2.5, 2.6, 2.7, 2.8 or 2.9 parts; and typically but not limitedly, carbon nanotubes account for, by weight, e.g. 1.1, 1.2, 1.3, 1.4, 1.5, 1.6, 1.7, 1.8, 1.9, 2, 2.1, 2.2, 2.3, 2.4, 2.5, 2.6, 2.7, 2.8 or 2.9 parts.

In the present disclosure, through the synergy among the polyether ether ketone, graphite, carbon fiber, glass fiber, copper sulfide and carbon nanotubes, the wear rate of yaw brake pads and the damage to the dual discs are effectively reduced, and the tensile strength, compressive strength as well as shear strength are improved.

In a preferred embodiment of the present disclosure, the yaw brake pad is prepared from, by weight, the following main ingredients: 70-75 parts of polyether ether ketone, 10-15 parts of carbon fiber, 3-5 parts of glass fiber, 3-5 parts of graphite, 1-2 parts of copper sulfide, 1-2 parts of carbon nanotubes, 1-2 parts of molybdenum sulfide, 1-2 parts of carbon nitride and 1-2 parts of zirconium carbide.

Molybdenum sulfide, also known as molybdenum disulfide, is black solid powder with metallic luster. It has a melting point of 1185° C., a density of 4.80 g/cm, and Mohs hardness of 1.0-1.5. It starts to decompose at 1370° C., and decomposes into molybdenum and sulfur at 1600° C. Molybdenum disulfide is not water soluble, but only soluble in aqua regia and boiled concentrated sulfuric acid. Molybdenum sulfide is used as an ingredient of the friction material because molybdenum sulfide reduces wear at low temperature and increases wear at high temperature, and molybdenum sulfide also prevents other ingredients from being oxidized.

Carbon nitride is a new covalent compound which is so hard that it is comparable with diamond but remains undiscovered in the nature. Its thermogravimetric analysis shows that carbon nitride still remains stable at 600° C. in air atmosphere, proving that it is a material that is high temperature tolerant and not easy to decompose. In addition, carbon nitride does not manifest solubility or reactivity in traditional solvents (including water, ethanol, dimethyl fumarate, tetrahydrofuran, diethyl ether and methylbenzene, etc.), which confirms its stability in organic solvents.

Through the addition of carbon nitride into the yaw brake pad, the wear resistance of the yaw brake pad is enhanced. Hence, in the course of braking, the material is of well responsive and brakes smoothly without screechy.

Zirconium carbide presents itself is a black solid. It is a high melting point material with great hardness, and is also an excellent refractory material with favorable high-temperature tolerance, corrosion resistance and wear resistance, thus being an outstanding high-temperature structural material. Besides, it is well thermally conductive.

Through the addition of zirconium carbide into the yaw brake pad, the hardness, corrosion resistance and high temperature tolerance of the yaw brake pad can be significantly enhanced.

In the present preferred embodiment, typically but not limitedly, the zirconium carbide accounts for, by weight, e.g. 1.1, 1.2, 1.3, 1.4, 1.5, 1.6, 1.7, 1.8 or 1.9 parts; typically but not limitedly, the carbon nitride accounts for, by weight, e.g. 1.1, 1.2, 1.3, 1.4, 1.5, 1.6, 1.7, 1.8 or 1.9 parts; and typically but not limitedly, the zirconium carbide accounts for, by weight, e.g. 1.1, 1.2, 1.3, 1.4, 1.5, 1.6, 1.7, 1.8 or 1.9 parts.

In a preferred embodiment of the present disclosure, the polyether ether ketone is granular, the carbon fiber is nano-sized carbon fiber, the glass fiber is nano-sized glass fiber and the graphite is nano-sized graphite.

In a preferred embodiment of the present disclosure, the polyether ether ketone has a melt index (MI) of 4-8 g/10 min at 400° C.

As ingredients, granular polyether ether ketone, nano-sized carbon fiber, nano-sized glass fiber and nano-sized graphite make it easier for these ingredients to mix to uniformity. In forming yaw brake pads, these ingredients synergize with each other to produce a yaw brake pad with improved mechanical property, more stable friction, lower hardness and lower noise.

In a preferred embodiment of the present disclosure, the carbon nanotubes have a length of 140-160 nm, preferably 150 nm.

In a preferred embodiment of the present disclosure, the main ingredients of the yaw brake pad further include, by weight, 1-2 parts of heat stabilizer.

Through the addition of heat stabilizer into the yaw brake pad as a main ingredient, on the one hand, the high-temperature tolerance of the yaw brake pad can be improved, and on the other hand, other ingredients can be prevented from decomposing in subsequent procedures which would compromise the comprehensive performance of the produced yaw brake pad.

In a preferred embodiment of the present disclosure, the heat stabilizer is one or at least two selected from the group consisting of antioxidant 1098(N,N'-hexamethylene-bis-(3, 5-di-tert-butyl-4-hydroxyhydrocinnamide)), antioxidant 168, antioxidant H161 and antioxidant 412S.

In a preferred embodiment of the present disclosure, the heat stabilizer may be: any one of antioxidant 1098, antioxidant 168(tris(2,4-di-tert-butylphenyl)phosphite), antioxidant H161 and antioxidant 412S (pentaerythrityl tetrakis(3-laurylthiopropionate)); alternatively, any of the combinations formed by two of them, including antioxidant 1098 and antioxidant 168, antioxidant 168 and antioxidant H161, or antioxidant H161 and antioxidant 412S; alternatively, a combination of antioxidant 1098, antioxidant 168, and antioxidant H161.

In a preferred embodiment of the present disclosure, the carbon nitride is modified by concentrated aqueous ammonia.

After the carbon nitride is subjected to concentrated aqueous ammonia, its interlayer spacing is further reduced, so that it shows better compatibility with polyether ether ketone when compounding with polyether ether ketone.

According to another aspect of the present disclosure, the embodiments of the present disclosure further provide a method of producing the above yaw brake pad, which includes the steps of:

(a) mixing the polyether ether ketone, carbon fiber, glass fiber, graphite, optional copper sulfide, optional carbon nanotubes, optional molybdenum sulfide, optional carbon nitride and optional zirconium carbide to obtain an uniform mixture; and (b) performing injection molding on the mixture to produce the yaw brake pad.

The yaw brake pad provided by the embodiments of the present disclosure is formed by injection molding, which is easy to practice and can be done consecutively, and thus significantly improves the efficiency of and lowers the cost of producing the yaw brake pad.

In a preferred embodiment of the present disclosure, the method of producing the yaw brake pad further includes step (s) which is provided between step (a) and step (b). In step (s), the mixture is pelletized through extrusion to obtain the mixture granules.

The main ingredients of the yaw brake pad are subjected to extrusion granulation first, and then the produced mixture granules are subjected to injection molding, so that these ingredients are well mixed, hence the produced yaw brake pad will have better and more stable performance.

In a preferred embodiment of the present disclosure, an injection molding machine is used to perform the injection molding.

The mixed ingredients are extruded by a double-screw extruder after being melted and plasticized by it, and then the melted extrudate is subjected to the injection molding by an injection machine.

Using an injection machine for injection molding leads to high production efficiency and yield, low processing cost, and makes it easier to put into large scale industrial production.

To provide a better understanding of the present disclosure, now the present disclosure will be further described with reference to the examples.

Example 1

The present example provided a yaw brake pad which was prepared from 70 parts of polyether ether ketone, 20 parts of nano-sized carbon fiber, 5 parts of nano-sized glass fiber and 5 parts of nano-sized graphite.

Example 2

The present example provided a yaw brake pad which was prepared from 73 parts of polyether ether ketone, 18 parts of nano-sized carbon fiber, 4 parts of nano-sized glass fiber and 4 parts of nano-sized graphite.

Example 3

The present example provided a yaw brake pad which was prepared from 70 parts of polyether ether ketone, 15 parts of nano-sized carbon fiber, 5 parts of nano-sized glass fiber, 5 parts of nano-sized graphite, 3 parts of copper sulfide and 2 parts of carbon nanotubes.

Example 4

The present example provided a yaw brake pad which was prepared from 73 parts of polyether ether ketone, 13 parts of nano-sized carbon fiber, 4 parts of nano-sized glass fiber, 4 parts of nano-sized graphite, 3 parts of copper sulfide and 3 parts of carbon nanotubes.

Example 5

The present example provided a yaw brake pad which was prepared from 75 parts of polyether ether ketone, 10 parts of nano-sized carbon fiber, 5 parts of nano-sized glass fiber, 3 parts of nano-sized graphite, 2 parts of copper sulfide, 2 parts of carbon nanotubes, 1 part of molybdenum sulfide, 1 part of carbon nitride and 1 part of zirconium carbide, in which the carbon nitride is modified by concentrated aqueous ammonia.

Example 6

The present example provided a yaw brake pad which was prepared from 73 parts of polyether ether ketone, 12 parts of nano-sized carbon fiber, 4 parts of nano-sized glass fiber, 4 parts of nano-sized graphite, 2 parts of copper sulfide, 2 parts of carbon nanotubes, 1 part of molybdenum sulfide, 1 part of carbon nitride and 1 part of zirconium carbide, in which the carbon nitride was modified by concentrated aqueous ammonia.

Example 7

The present example provided a yaw brake pad which was prepared from 72 parts of polyether ether ketone, 12 parts of nano-sized carbon fiber, 4 parts of nano-sized glass fiber, 4 parts of nano-sized graphite, 2 parts of copper sulfide, 2 parts of carbon nanotubes, 1 part of molybdenum sulfide, 1 part of carbon nitride, 1 part of zirconium carbide and antioxidant H161, in which the carbon nitride was modified by concentrated aqueous ammonia.

Example 8

The present example differs from Example 7 in that no copper sulfide was added.

Example 9

The present example differs from Example 7 in that no carbon nanotube was added.

Example 10

The present example differs from Example 7 in that no molybdenum sulfide was added.

Example 11

The present example differs from Example 7 in that no carbon nitride was added.

Example 12

The present example differs from Example 7 in that no zirconium carbide was added.

The yaw brake pad provided by Examples 1-12 above is made by a method which includes the steps of:

(a) mixing the polyether ether ketone, carbon fiber, glass fiber, graphite, optional copper sulfide, optional carbon nanotubes, optional molybdenum sulfide, optional carbon nitride and optional zirconium carbide to obtain an uniform mixture; and (s) using an extruder to perform the extrusion on the mixture, so as to produce the mixture granules; and (b) using a double-screw extruder to melt and plasticize the mixture granules, and then extrude the molten material, thereafter, using an injection machine to perform the injection molding on the extruded molten material; in which the double-screw extruder has a heating temperature of 370-375° C. in section 1, 380-385° C. in section 2 and 400-405° C. in section 4, and has a screw speed of 100-300 rpm, the injection mold of the injection machine is at a temperature of 100-200° C., the injection tube is at a temperature of 350-450° C., the injection backpressure ranges from 1 to 5 MPa, and the injection pressure ranges from 100 to 200 Mpa.

Comparative Example 1

The present comparative example provided a yaw brake pad which was prepared from 50 parts of polyether ether ketone, 20 parts of nano-sized carbon fiber, 10 parts of nano-sized glass fiber and 10 parts of nano-sized graphite.

Comparative Example 2

The present comparative example provided a yaw brake pad which was prepared from 90 parts of polyether ether ketone, 6 parts of nano-sized carbon fiber, 2 parts of nano-sized glass fiber and 2 parts of nano-sized graphite.

Comparative Example 3

The present comparative example differs from Example 2 in that no nano-sized carbon fiber was added.

Comparative Example 4

The present comparative example differs from Example 2 in that no nano-sized glass fiber was added.

Comparative Example 5

The present comparative example differs from Example 2 in that no nano-sized graphite was added.

The method of producing the yaw brake pad provided in Comparative Examples 1-5 above is the same with Example 2 and thus will not be repeated here.

Mechanical, noise, heat resistance and wear rate tests were performed on the yaw brake pads provided by Examples 1-12 and the yaw brake pads provided by Comparative Examples 1-5, respectively. Table 1 lists the data of the tests.

satisfy the demand of the wind driven generator for yaw braking at a low speed.

As can be seen from the comparisons of Examples 5-7 and Examples 8-12, through the synergy among polyether ether ketone, nano-sized graphite, nano-sized carbon fiber, nano-sized glass fiber, carbon nanotubes, copper sulfide, molybdenum sulfide, carbon nitride and zirconium carbide, the produced yaw brake pads have a further improved friction coefficient, further improved high temperature tolerance, further enhanced mechanical properties, and thus further improved comprehensive performance.

As last, it should be noted that the above examples are provided only to explain the technical solutions of the present disclosure, rather than to limit the present disclosure. Although the present disclosure is described in details with reference to the aforementioned examples, those ordinarily skilled in the art should appreciate that they may still make modifications to the technical solutions contained in those examples, or make equivalent replacements to some or all of the technical features therein. Such modifications or replacements should not depart the essence of the respective technical solutions from the scope of the technical solutions in the examples of the present disclosure.

TABLE 1

Table of Data of the Tests of the Properties of Yaw Brake Pads

| | Friction coefficient | | Noise | Tensile strength | Compressive strength | Shear strength | Maximum withstanding temperature | Maximum continuous withstanding temperature | Wear rate |
|---|---|---|---|---|---|---|---|---|---|
| | Dynamic | Static | (dB) | (MPa) | (MPa) | (MPa) | (° C.) | (° C.) | (cm$^3$/J × 10$^{-8}$) |
| Example 1 | 0.40 | 0.35 | 25 | 148 | 212 | 30 | 341 | 250 | 0.52 |
| Example 2 | 0.40 | 0.35 | 25 | 150 | 215 | 30 | 342 | 251 | 0.51 |
| Example 3 | 0.42 | 0.36 | 22 | 156 | 221 | 33 | 353 | 256 | 0.45 |
| Example 4 | 0.42 | 0.36 | 21 | 157 | 222 | 34 | 352 | 257 | 0.44 |
| Example 5 | 0.43 | 0.37 | 21 | 163 | 227 | 37 | 362 | 265 | 0.32 |
| Example 6 | 0.43 | 0.37 | 20 | 164 | 228 | 38 | 363 | 266 | 0.31 |
| Example 7 | 0.43 | 0.37 | 20 | 164 | 228 | 38 | 365 | 268 | 0.30 |
| Example 8 | 0.40 | 0.35 | 25 | 149 | 212 | 31 | 344 | 251 | 0.50 |
| Example 9 | 0.40 | 0.35 | 26 | 150 | 213 | 31 | 343 | 252 | 0.51 |
| Example 10 | 0.40 | 0.35 | 24 | 151 | 214 | 31 | 345 | 251 | 0.50 |
| Example 11 | 0.40 | 0.35 | 25 | 151 | 212 | 30 | 343 | 251 | 0.50 |
| Example 12 | 0.40 | 0.35 | 25 | 152 | 214 | 31 | 342 | 252 | 0.51 |
| Comparative Example 1 | 0.41 | 0.32 | 43 | 83 | 157 | 25 | 325 | 221 | 1.52 |
| Comparative Example 2 | 0.35 | 0.31 | 41 | 52 | 127 | 22 | 332 | 232 | 1.24 |
| Comparative Example 3 | 0.30 | 0.28 | 41 | 56 | 142 | 26 | 328 | 212 | 1.12 |
| Comparative Example 4 | 0.32 | 0.31 | 42 | 54 | 151 | 27 | 330 | 215 | 1.08 |
| Comparative Example 5 | 0.34 | 0.31 | 42 | 57 | 147 | 26 | 329 | 218 | 1.15 |

As can be seen from the comparisons of Examples 1-12 and Comparative Examples 1-5, using polyether ether ketone as the matrix resin, carbon fiber and glass fiber as the reinforcing material, and graphite as the heat conduction material, the yaw brake pads provided by Examples 1-12 get not only significantly improved mechanical properties (tensile strength, shear strength and compressive strength) and high-temperature tolerance (maximum withstanding temperature and maximum continuous withstanding temperature), much lower hardness, less wear to the dual discs, and lower noise, but also get improved friction stability and adaptability to working conditions, and thus can effectively

The invention claimed is:

1. A yaw brake pad, characterized in that preparation ingredients of the yaw brake pad comprise, by weight: 70-75 parts of polyether ether ketone, 10-20 parts of carbon fiber, 3-5 parts of glass fiber and 3-5 parts of graphite, 1-3 parts of copper sulfide and 1-3 parts of carbon nanotubes.

2. The yaw brake pad according to claim 1, characterized in that the preparation ingredients of the yaw brake pad comprise, by weight : 70-75 parts of polyether ether ketone, 10-15 parts of carbon fiber, 3-5 parts of glass fiber, 3-5 parts of graphite, 1-2 parts of copper sulfide, 1-2 parts of carbon nanotubes, 1-2 parts of molybdenum sulfide, 1-2 parts of carbon nitride and 1-2 parts of zirconium carbide.

3. The yaw brake pad according to claim 2, wherein the the preparation ingredients of the yaw brake pad further comprise, by weight, 1-2 parts of a heat stabilizer.

4. The yaw brake pad according to claim 2, wherein the carbon nitride is modified by concentrated aqueous ammonia.

5. The yaw brake pad according to claim 1, wherein the preparation ingredients of the yaw brake pad further comprise, by weight, 1-2 parts of a heat stabilizer.

6. The yaw brake pad according to claim 5, wherein the heat stabilizer is one or at least two selected from the group consisting of N,N'-hexamethylene-bis-(3,5-di-tert-butyl-4-hydroxyhydrocinnamide), tris(2,4-di-tert-butylphenyl)phosphite and pentaerythrityl tetrakis(3-laurylthiopropionate).

7. A method of producing the yaw brake pad according to claim 1, wherein the method comprises steps of:
(a) mixing the preparation ingredients of the yaw brake pad to obtain an uniform mixture, wherein the preparation ingredients of the yaw brake pad comprises: 70-75 parts of the polyether ether ketone, 10-20 parts of the carbon fiber, 3-5 parts of the glass fiber and 3-5 parts of the graphite, 1-3 parts of the copper sulfide and 1-3 parts of the carbon nanotubes; and
(b) performing injection molding on the uniform mixture to produce the yaw brake pad.

8. The method of producing the yaw brake pad according to claim 7, wherein the preparation ingredients of the yaw brake pad , by weight, comprises: 70-75 parts of polyether ether ketone, 10-15 parts of carbon fiber, 3-5 parts of glass fiber, 3-5 parts of graphite, 1-2 parts of copper sulfide, 1-2 parts of carbon nanotubes, 1-2 parts of molybdenum sulfide, 1-2 parts of carbon nitride and 1-2 parts of zirconium carbide.

9. The method of producing the yaw brake pad according to claim 8, wherein the carbon nitride is modified by concentrated aqueous ammonia.

10. The method of producing the yaw brake pad according to claim 7, wherein the preparation ingredients of the yaw brake pad further comprise, by weight, 1-2 parts of heat stabilizer.

11. The method of producing the yaw brake pad according to claim 10, wherein the heat stabilizer is one or at least two selected from the group consisting of N,N'-hexamethylene-bis-(3,5-di-tert-butyl-4-hydroxyhydrocinnamide), tris(2,4-di-tert-butylphenyl) phosphite and pentaerythrityl tetrakis (3-laurylthiopropionate).

12. The method of producing the yaw brake pad according to claim 7, wherein the method further comprises step (s), with the step (s) provided between the step (a) and the step (b), wherein in the step (s), the uniform mixture is pelletized through extrusion to obtain mixture granules.

13. The method of producing the yaw brake pad according to claim 7, wherein an injection molding machine is used for the injection molding.

* * * * *